United States Patent [19]
Müller

[11] Patent Number: 5,018,404
[45] Date of Patent: May 28, 1991

[54] CONTROL ARRANGEMENT FOR A GEAR SHIFT TRANSMISSION

[75] Inventor: Robert Müller, Mönsheim, Fed. Rep. of Germany

[73] Assignee: Dr. Ing. h.c.F. Porsche AG, Fed. Rep. of Germany

[21] Appl. No.: 446,856

[22] Filed: Dec. 6, 1989

[30] Foreign Application Priority Data

Dec. 12, 1988 [DE] Fed. Rep. of Germany ....... 3841780

[51] Int. Cl.$^5$ .................... F16H 63/36; F16H 59/04; F16H 3/38
[52] U.S. Cl. .......................................... 74/477; 74/339
[58] Field of Search .................................. 74/339, 477

[56] References Cited

U.S. PATENT DOCUMENTS

| | | | |
|---|---|---|---|
| 2,175,449 | 10/1939 | Stanard | 74/477 |
| 3,264,895 | 8/1966 | Turunen | 74/477 |
| 3,274,842 | 9/1966 | Huff | 74/477 X |
| 3,677,105 | 7/1972 | Dence | 74/477 |
| 4,583,418 | 4/1986 | Nakayama et al. | 74/477 |

FOREIGN PATENT DOCUMENTS 3125632 9/1982 Fed. Rep. of Germany .
2403494 4/1979 France .
2433430 3/1980 France .

OTHER PUBLICATIONS

"Sports Auto", p. 127, Apr. 1988.

Primary Examiner—Allan D. Herrmann
Attorney, Agent, or Firm—Evenson, Wands, Edwards, Lenahan & McKeown

[57] ABSTRACT

A controlling arrangement for a motor vehicle gear shift transmission has a central component shift piece which interacts with several shift rails disposed next to one another and assigned to the individual transmission gears and with a shift rail lock mechanism that, when one shift rail respectively is moved, locks the remaining shift rails. A shift finger mounted on the shift piece has involute flanks on both sides, which flanks rest against plane V-surfaces of a V-shaped recess of the shift rail to be controlled. Locking cams of the locking mechanism rest against the V-surfaces of the other shift rails and are axially and radially offset with respect to the shift finger mounted on the shift piece.

12 Claims, 3 Drawing Sheets

CONTROL ARRANGEMENT FOR A GEAR SHIFT TRANSMISSION

BACKGROUND AND SUMMARY OF THE INVENTION

The invention relates to a control arrangement for a gear shift transmission of a motor vehicle wherein a shift piece is longitudinally slidable on a shifting shaft by a selector lever fastened to a preselector shaft and is non-rotatably connected with the shifting shaft. The shift piece controls shifting forks assigned to individual transmission gears and engages synchronizing clutches through a shift finger interacting with several shift rails disposed next to one another. A locking system is provided so that when one shift rail is moved, the remaining shift rails are locked.

A similar type control arrangement for a gear shift transmission is described in the journal *Sport Auto*, 4/1988, Page 127. There a first Bowden cable is controlled by the gear shift lever to preselect the transmission gears and a second Bowden cable shifts the individual transmission gears through shift forks and synchronizing clutches. A control arrangement known from DE-PS 31 25 632, is used as the connection from the shift forks to the preselector shaft and the shifting shaft is controlled by the Bowden cables. The shifting shaft is equipped with a radially projecting shift finger which engages in recesses of shift rails forming shifting lanes. The shift rails affecting the shift forks can be moved transversely with respect to the shifting shaft. A sliding of the shift finger in the direction of the axis of the shifting shaft preselects the transmission gears. A swivelling of the shift finger shifts the transmission gears. The shift rails disposed next to the selected shifting lane are each blocked by cams which are constructed in one piece with the shift finger and rest against circular-arc-shaped wall parts of the shift rails on the inside.

In order to achieve a compact construction of the shifting arrangement, the shift finger must be constructed to be as short as possible. The swivelling angle of the shift finger (required for the shifting) therefore becomes relatively large so that during swivelling, the effective lever arm is considerably shortened in an undesirable manner.

It is an object of the invention to provide a functionally improved shifting arrangement which can be manufactured at reasonable cost.

This object is achieved by having the shift finger equipped with an involute flank which is applied to a plane contact surface of the shift rail to be controlled. When the shift finger is applied to a plane contact surface of the shift rail to be controlled by an involute flank, a swivelling motion of the shift finger into a pushing motion of the shift rail with a transmission ratio which is constant over the swivelling angle can be obtained. If the shifting motion is introduced into the shifting arrangement by way of an exterior linearly controlled pivoted lever, a rising course is obtained on a graph, which plots the path ratio between the manual shift lever to be operated by the driver and the pushing path causing the gear synchronizing. Thus a desirable high leverage is available at the start of the synchronizing movement and a low leverage is available at the end.

It is desirable if involute flanks located on both sides of the shift finger, engage in a V-recess of the shift rail to be controlled and rest against the plane V-surfaces of the recess. The manufacturing of the shift rails having V-recesses of this type is simplified significantly and can be carried out at lower cost, particularly if hardened shift rails are used, which rails must be reground because of the unavoidable distortion due to hardening. A good response is obtained if the V-recess has an angle of approximately 60 degrees.

It is also advantageous if the locking system is provided by diametrically opposite stop cams that are mounted on the shift piece vertically and axially offset with respect to the shift finger. Circular outer contours of these stop cams will rest against the V-surfaces of the shift rails to be locked.

The transmission is provided with three shift rails, each being assigned to two transmission gears. These shift rails have shift lugs for engaging in shift forks which are longitudinally guided on a guiding tube. The guiding tube is in parallel with respect to the transmission shafts and the moveable shaft forks operate sliding sleeves which control the synchronizing clutches.

Other objects, advantages and novel features of the present invention will become apparent from the following detailed description of the invention when considered in conjunction with the accompanying drawings.

DETAILED DESCRIPTION OF THE DRAWINGS

Figure 1:
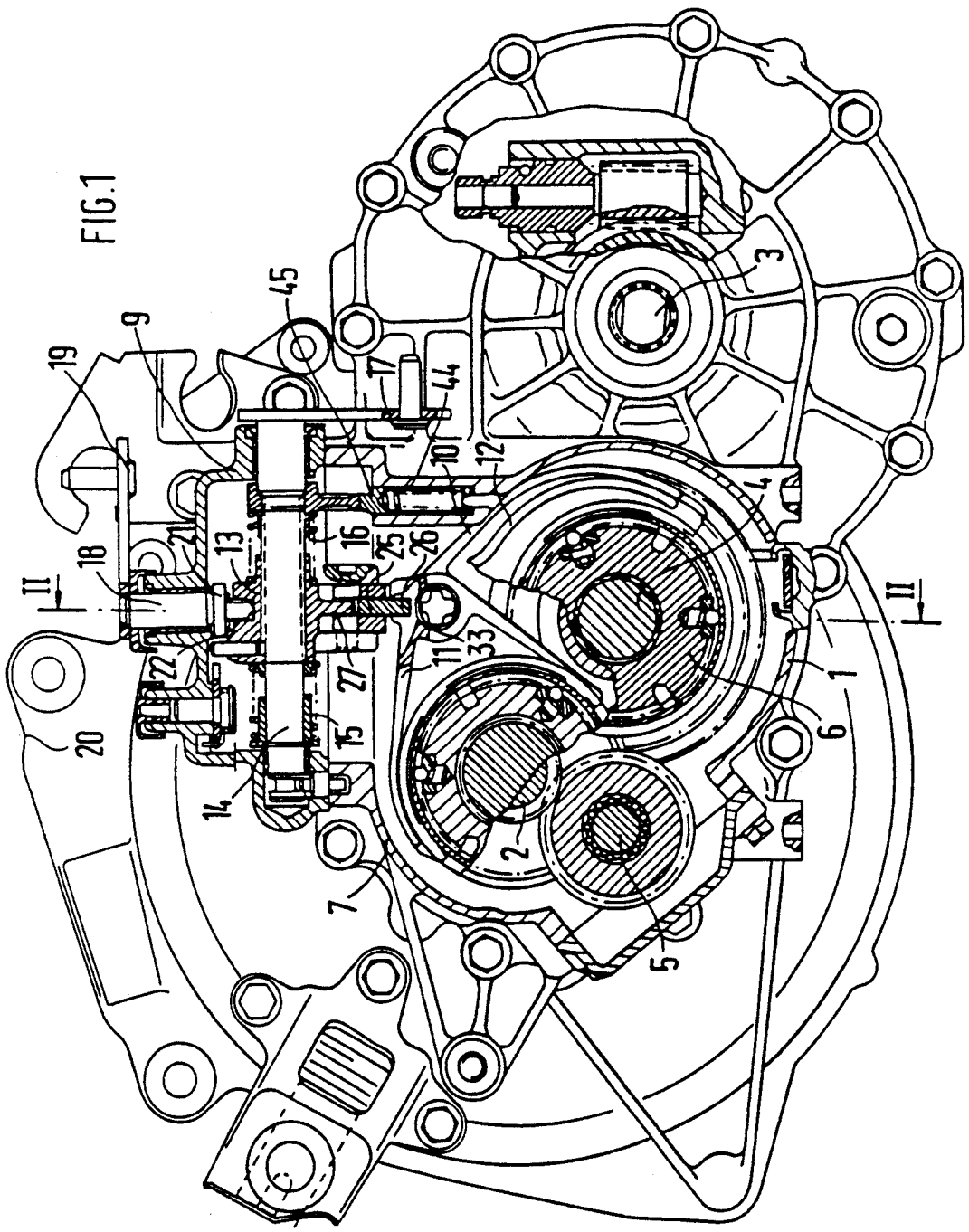
FIG. 1 is a cross-sectional view of a shifting arrangement for a 5-speed transmission.

A drive shaft 2 driven by an engine of a motor vehicle, an output shaft 4 driving the front axle of the motor vehicle, and an intermediate shaft 5 for the reverse gear R are arranged in parallel to one another in a transmission case 1. The transmission gears G1, G2, G3, G4 and G5, which each consist of a fixed gear wheel and a loose gear wheel mating with it, as well as the reverse gear R, are all arranged in sequence on the drive shaft 2, or the output shaft 4, and can be connected together by synchronizing clutches 6.

In the upper area of the transmission case 1, a shift control housing 7 is integrally cast with the transmission case 1 and, together with the transmission case 1, are closed off by an end-face bearing cap 8. A cover 9 is screwed onto the shift control housing 7, which is open on top. This cover 9 contains the whole control arrangement for the shift forks 10, 11 and 12 engage in sliding sleeves of the synchronizing clutches 6. A shift piece 13 is provided as the central element of the control arrangement and is connected with a shifting shaft 14 by a serrated connection, in a torque-transmitting manner. The shift piece 13 can be longitudinally slid on the shifting shaft 14 against the force of coil springs (spring 15 resting against it on the left and spring 16 on the right). The shifting shaft 14 is pivotally connected to a Bowden cable (not shown) that leads to a gear shift lever (also not shown) by means of a lever 17 mounted at an end face. The preselecting movement is carried out by means of a preselecting shaft 18 which is located in the cover 9 and disposed vertically with respect to the shifting shaft 14. This preselecting shaft 18 is pivotally connected at one end to an end-face lever 19 attached to Bowden cable 20, which in turn is connected with the gear shift lever.

Figure 2:
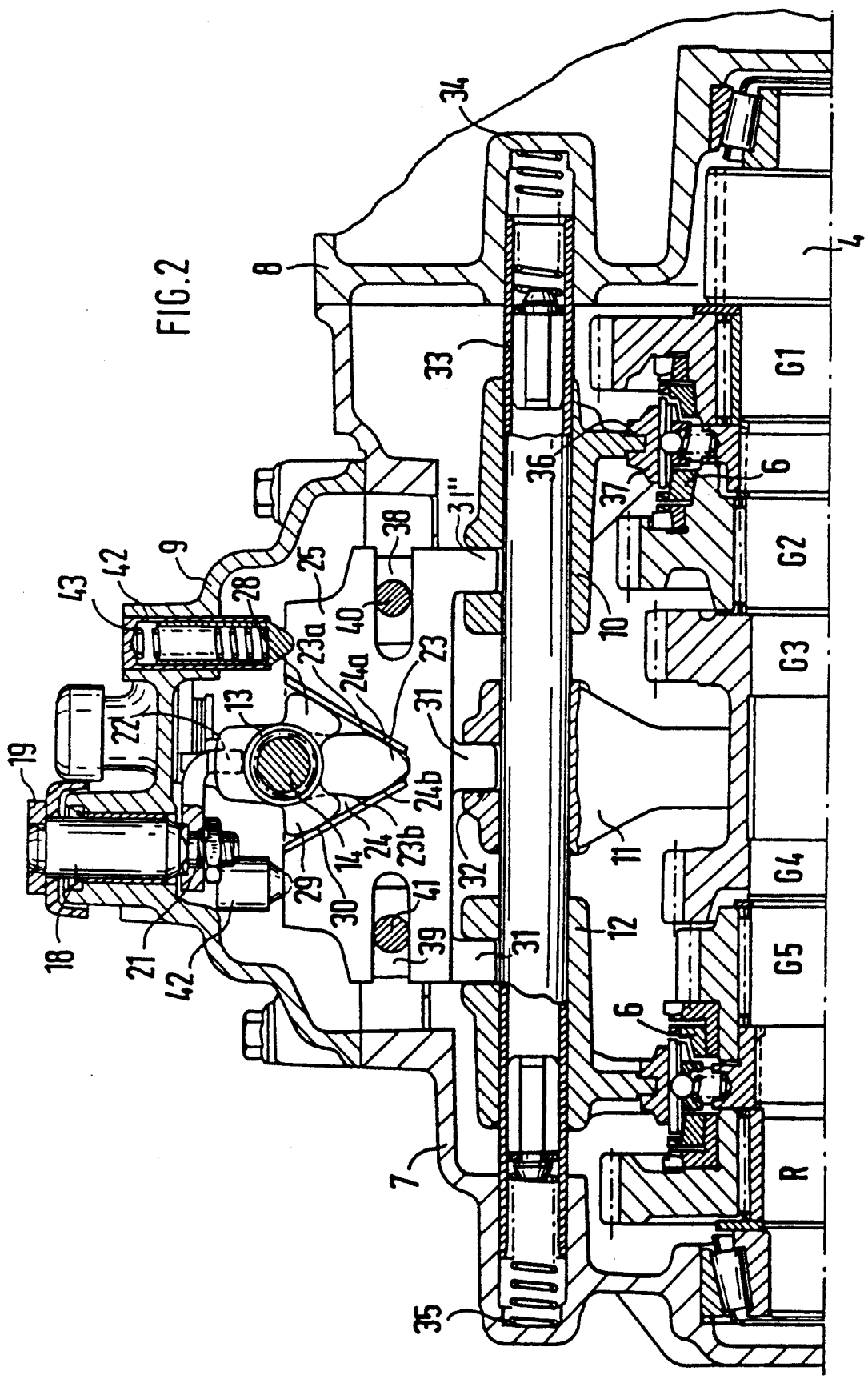
FIG. 2 is a longitudinal sectional view of the shifting arrangement according to Line II—II of FIG. 1.
Figure 3:
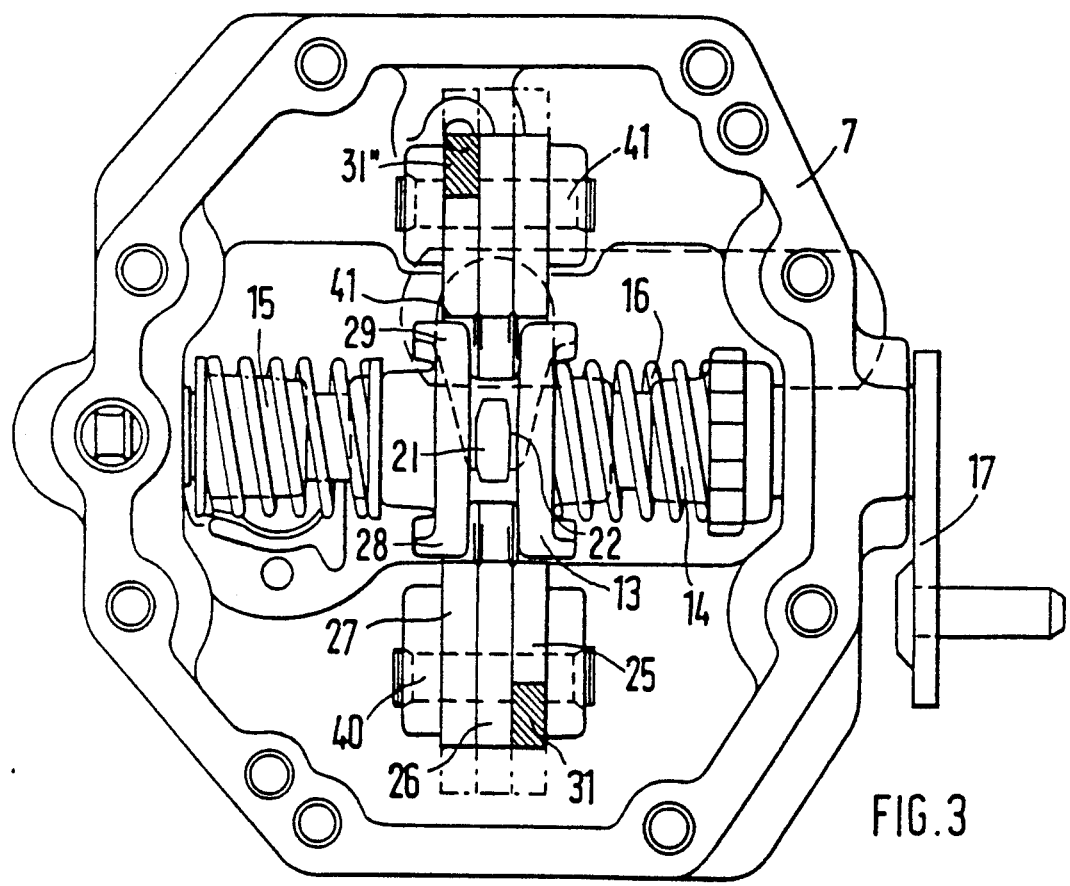
FIG. 3 is a top view of the shifting arrangement when the cover is removed.

At its other end, the preselector shaft 18 has a selector lever 21 which engages in a groove 22 at the top side of the shift piece 13. A shift finger 23 is cast to the tube hub of the shift piece 13 diametrically opposite the groove 22. The finger 23 can be inserted into continuous V-recesses 24 of three shift rails 25, 26, 27 resting against one another. The shift finger 23 has two involute flanks 23a, 23b, one on each side thereof. The flanks 23a, 23b rest on two plane side surfaces 24a, 24b of the V-shaped recess 24 on any one of shift rails 25, 26, 27. The V-shape notch has an angle of approximately 60 degrees. As shaft 14 is rotated by lever 17, the appropriate shift rail 25, 26, 27 will be carried by flanks 23a, 23b into movement either to the left or right as viewed in FIG. 2 as determined by the direction of rotation of shaft 14 by lever 17. Lever 21 will position the finger 23 in the recess 24 of the appropriate shift rail 25, 26, 27. Two radially projecting stop cams 28, 29 are mounted at the shift piece 13 vertically and axially offset with respect to the shift finger. The cams 28, 29 form a cross with the center plane of the shift piece 13 extending through the shift finger and the groove. The outer contour of the stop cam 28 is circular-arc-shaped and can be inserted in V-recesses 30 of the shift rails 25, 26, 27. The stop cams 28, 29, in the longitudinal direction of the shift piece 13, are arranged with respect to the shift finger 23 such that when the shift finger 23 engages in the V-recess 24 of one shift rail 25, the stop cams 28, 29 engage in the V-recesses 24 of the two other shift rails 26, 27 and against their side surfaces 24a, 24b to stop them from sliding.

Each of the three shift rails 25, 26, 27 has a shift lug 31 at its underside, the shift lug 31 of the central shift rail 26 engaging in a recess 32 of the central shift fork 11, the shift lugs 31 31'' of the left and the right shift rails 25, 27 engaging in the left shift fork 12 and in the right shift fork 10 respectively.

The shift forks 10, 11, 12 are longitudinally movably guided on a guiding tube 33 which is in parallel with respect to the output shaft 4. This guiding tube 33 is disposed in the shift control housing 7 and is longitudinally movably supported with respect to it by means of springs 34 and 35 on both sides, in order to avoid a jamming of the shift forks 10, 11, 12. Fork end of the shift forks engage in ring bores of the sliding sleeves 37 controlling the synchronizing clutches 6.

In order to be able to longitudinally guide the shift rails 25, 26, 27 in parallel with respect to the guiding tube 33, the rails have guide slots 38, 39 on both sides. Rivets 40, 41 are fitted into these guide slots 38, 39. Locking sleeves 42 engage in recesses of the shift rails 25, 26, 27 from above; are longitudinally movably fitted into the cover 9; are disposed in parallel with respect to the preselector lever 18; and are loaded by coil springs 43. The locking sleeves 42 define the neutral central position of the shift rails 25, 26, 27.

The rotating positions of the shifting shaft 14 and shift piece 13 and thus the shifting positions of the transmission gears are secured by a locking sleeve 44, which elastically engages recesses of a locking disk 45 fastened to the shifting shaft 14.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An arrangement for controlling a synchronized gear shift transmission of a motor vehicle, comprising:
    a shift piece means that is longitudinally slidable on a shifting shaft by a selector lever fastened to a preselector shaft;
    said shift piece means is non-rotatably connected with the shifting shaft;
    the shift piece means controls shifting forks that engage synchronizing clutches of individual transmission gears by a shifting finger interacting with several shift rails disposed next to one another;
    stop means for restraining remaining shift rails when one shift rail is moved; and
    wherein the shift finger is equipped with an involute flank which is applied to a plane contact surface of the shift rail to be moved.

2. An arrangement according to claim 1, wherein the shift finger has at least two involute flanks, one on each side of the finger; and
    wherein said flanks rest against two plane V-surfaces of a V-shaped recess that constitutes the contact surface of the shift rail.

3. An arrangement according to claim 2, wherein the V-shaped recess has an angle of approximately 60 degrees.

4. An arrangement according to claim 1, wherein the stop means comprises diametrically opposite stop cams vertically mounted on the shift piece with respect to the shift finger and axially offset with respect to the shaft finger; and
    wherein circular outer contours of these stop cams rest against a V-surface of the shift rails to be locked.

5. An arrangement according to claim 2, wherein the stop means comprises diametrically opposite stop cams vertically mounted on the shift piece with respect to the shift finger and axially offset with respect to the shift finger; and
    wherein circular outer contours of these stop cams rest against the V-surface of the shift rails to be locked.

6. An arrangement according to claim 3, wherein the stop means comprises diametrically opposite stop cams vertically mounted on the shift piece with respect to the shift finger and axially offset with respect to the shift finger; and
    wherein circular outer contours of these stop cams rest against a V-surface of the shift rails to be locked.

7. An arrangement according to claim 1, wherein the several shift rails are three in number and are each respectively assigned to two transmission gears;
    wherein each of the shift rails, have shift lugs means for engaging the shift forks;
    wherein the shift forks are longitudinally guided on a guiding tube which is in parallel with respect to transmission shafts of the transmission; and
    wherein the shift forks engage sliding sleeves to control the synchronizing clutches.

8. An arrangement according to claim 2, wherein the several shift rails are three in number and are each respectively assigned to two transmission gears;
    wherein each of the shift rails, have shift lugs means for engaging the shift forks;

wherein the shift forks are longitudinally guided on a guiding tube which is in parallel with respect to transmission shafts of the transmission; and wherein the shift forks engage sliding sleeves to control the synchronizing clutches.

9. An arrangement according to claim 3, wherein the several shift rails are three in number and are each respectively assigned to two transmission gears;

wherein each of the shift rails, have shift lugs means for engaging the shift forks;

wherein the shift forks are longitudinally guided on a guiding tube which is in parallel with respect to transmission shafts of the transmission; and wherein the shift forks engage sliding sleeves to control the synchronizing clutches.

10. An arrangement according to claim 4, wherein the several shift rails are three in number and are each respectively assigned to two transmission gears;

wherein each of the shift rails, have shift lugs means for engaging the shift forks;

wherein the shift forks are longitudinally guided on a guiding tube which is in parallel with respect to transmission shafts of the transmission; and wherein the shift forks engage sliding sleeves to control the synchronizing clutches.

11. An arrangement according to claim 5, wherein the several shift rails are three in number and are each respectively assigned to two transmission gears;

wherein each of the shift rails, have shift lugs means for engaging the shift forks;

wherein the shift forks are longitudinally guided on a guiding tube which is in parallel with respect to transmission shafts of the transmission; and wherein the shift forks engage sliding sleeves to control the synchronizing clutches.

12. An arrangement according to claim 6, wherein the several shift rails are three in number and are each respectively assigned to two transmission gears;

wherein each of the shift rails, have shift lugs means for engaging the shift forks;

wherein the shift forks are longitudinally guided on a guiding tube which is in parallel with respect to transmission shafts of the transmission; and wherein the shift forks engage sliding sleeves to control the synchronizing clutches.

* * * * *